Aug. 11, 1931.   W. NELSON   1,818,573
DUAL WHEEL
Filed May 15, 1928
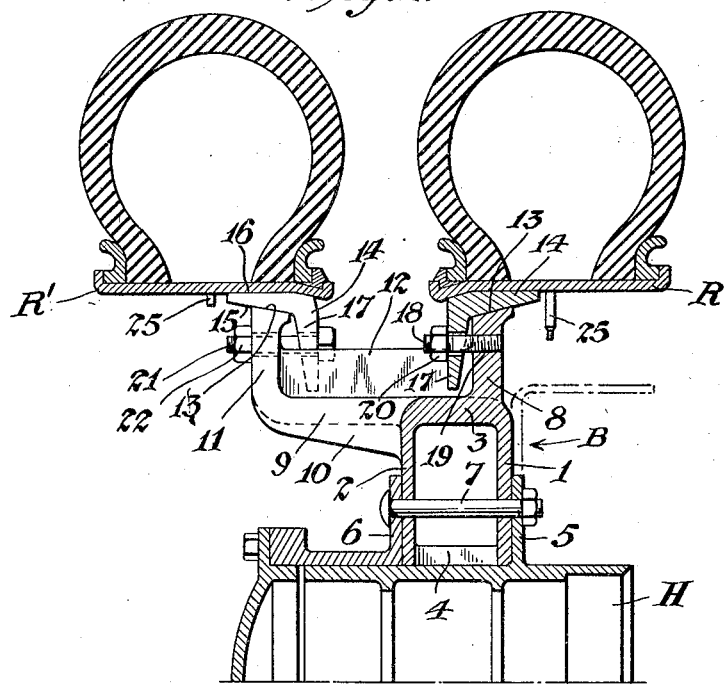
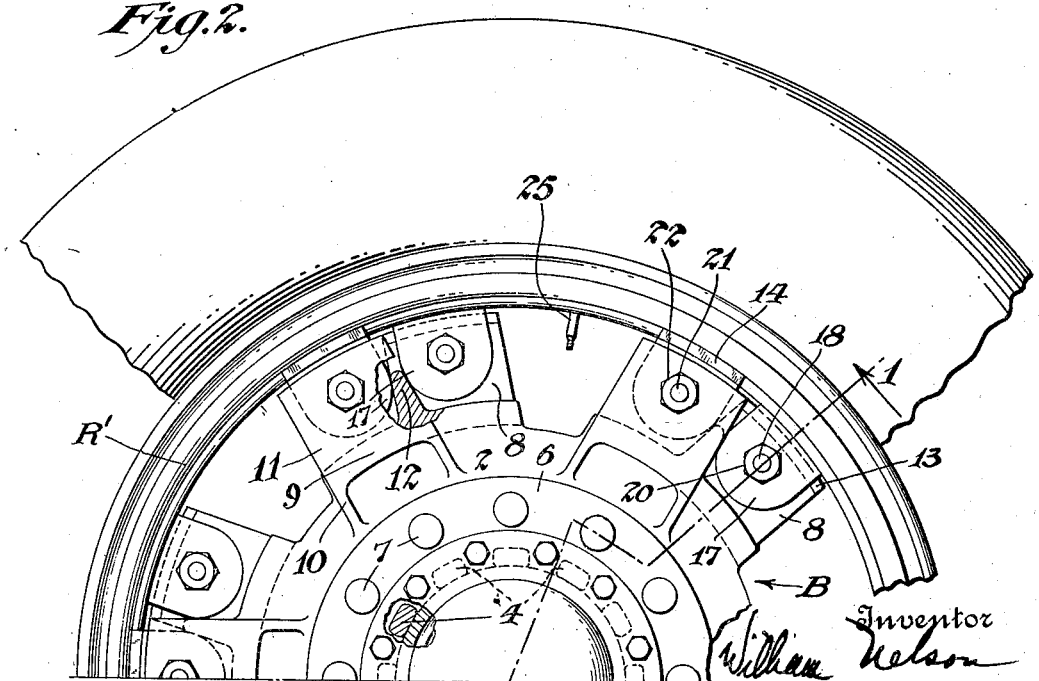

Patented Aug. 11, 1931

1,818,573

UNITED STATES PATENT OFFICE

WILLIAM NELSON, OF MINNEAPOLIS, MINNESOTA

DUAL WHEEL

Application filed May 15, 1928. Serial No. 277,882.

My invention relates to metal wheels, and especially those designed to support two demountable tire-rims.

The principal objects are to provide a metal wheel body which is applicable to standard hubs as ordinarily designed for wood-spoke wheels; to provide spoke-reinforcing and stiffening webs or flanges which also act as fan-blades to promote rim and tire cooling; and to so arrange the rim-attachment lugs that they are supported or braced by the flanges.

The characteristics and advantages of the invention are further sufficiently explained in connection with the following detail description of the accompanying drawings, which shows one representative embodiment. After considering this example, skilled persons will understand that many variations may be made without departing from the principles disclosed, and I contemplate the employment of any structures that are properly within the scope of the appended claims.

In the drawings:

Fig. 1 is a half-section of a wheel embodying the invention in one form, the section plane being indicated at 1—1, Fig. 2.

Fig. 2 is a side elevation of one-half of the wheel.

The wheel body B has a central portion of hollow, or annular box-form, including spaced inner and outer walls 1 and 2 respectively, connected by a peripheral wall 3, and also by axial, integral blocks or spacers 4 to prevent convergent deflection of the walls under bolt pressure. The bore of this central portion is diametered to fit the cylindrical hub H, which is one typical hub as designed for wood-spoked wheels, and the thickness of the central body-portion is also such as to suit the normal spacing of the hub flanges 5 and 6, so that the metal body is applied to the hub in lieu of the usual wood-spokes, and secured by the ordinary clamping bolts 7, passing through holes in walls 1 and 2.

From the periphery of the central body portion, project radially, spaced short inner spokes 8; and from the outer side project integral brackets 9 having stiffening ribs or flanges 10, and terminating in short radial outer spokes 11. The inner and outer spokes are in partially staggered relation; that is, as best shown in Fig. 2, the right-hand radial edge of an outer spoke 11 is approximately axially aligned with the left-hand radial edge of the nearest inner spoke 8; and these spoke portions are connected by an integral radial blade or web 12, which is also integral with the outer bracket 9 and with the peripheral wall 3. The inner and outer spokes are thus effectively braced and stiffened, and the webs 12 also act as fan-blades, promoting circulation of air outwardly between arms 9 and the spaced rims and tires (later referred to) to effectively cool the same.

The ends of the spokes are formed with segmental-conical clamp-supporting surfaces 13, oppositely-directed with respect to the inner and outer spokes, to provide for mounting the rims R and R' in relatively-reversed positions, and preferably in edge-mounted relation to the spoke ends, as sufficiently explained in Fix. 1, so providing for practically uniform spacing of the tires, regardless of reasonable variations in tire-cross-sectional diameter.

The rims may be of any known or suitable type, those shown being one standard form of demountable rim on which the tire shoe is detachably secured.

Wedge clamps 14 are provided, having inner and outer faces 15 and 16, respectively complemental to the spoke surfaces 13 and the inner contours of the rims. Each clamp includes an inwardly-radial lug 17, and one edge of each lug is in contact with one face of one of the webs 12, so that the lugs and clamps are braced by the webs, and rotary strains acting on the clamps are largely taken up by the webs, and a direct drive is provided between the spokes and the rims.

The spokes and clamp lugs are bored to cooperate with clamping bolts or screws. Thus, for the inner spokes stud-bolts 18 are inserted in threaded holes 19 of the spokes, and these bolts pass freely through holes in the inner clamp-lugs, and nuts 20 provide for the clamping action. For the outer clamps, bolts 21 pass freely through registering holes in the clamp-lugs and spokes, respectively, and nuts 22 produce the clamping action. By this arrangement, the inner bolts may remain in the spokes; the outer bolts are easily inserted and removed by "reaching" in behind the outer spokes and clamp-lugs, and both the inner and outer clamping nuts are easily accessible to a socket wrench, as Fig. 2 readily explains.

The semi-staggered arrangement of the inner and outer spokes provides for easy access to the valve-stem 25 of the inner tire, which may be located at a point midway between an outer and an inner spoke, in the circumferential direction (Fig. 2) and may be "reached" from the outside of the wheel by passing the hand and inflating connection between the adjacent outer spokes and past the adjacent edge of the nearest inner spoke.

I claim:

1. A wheel center consisting of an annular body portion, spokes radiating from said body adjacent one side thereof, brackets projecting from the opposite side of said body, spokes each extending radially of the body axis from the end of a respective bracket, said last spokes being staggered circumferentially of the body with respect to the first spokes, and ribs each extending from a respective first spoke to a respective second spoke and connecting the proximal edges of the respective pair of spokes.

2. A wheel center consisting of an annular body portion, spokes radiating from said body adjacent one side thereof, brackets projecting from the opposite side of said body, spokes each extending radially of the body axis from the end of a respective bracket, said last spokes being staggered circumferentially of the body with respect to the first spokes, and ribs each extending from a respective first spoke to a respective second spoke and connecting the proximal edges of the respective pair of spokes, the staggering of the second mentioned spokes being sufficient to offset said second mentioned spokes a distance slightly less than the width of a spoke whereby the central longitudinal plane of each of said ribs passes radially through the axis of the wheel.

In testimony whereof I affix my signature.

WILLIAM NELSON.